(12) United States Patent
Vermeulen et al.

(10) Patent No.: US 11,609,397 B2
(45) Date of Patent: *Mar. 21, 2023

(54) TELECOMMUNICATIONS SYSTEM

(71) Applicant: COMMSCOPE CONNECTIVITY BELGIUM BVBA, Kessel-Lo (BE)

(72) Inventors: Pieter Vermeulen, Westerlo (BE); Johan Geens, Bunsbeek (BE); Romain Cuypers, Herent (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,029

(22) Filed: Nov. 1, 2021

(65) Prior Publication Data

US 2022/0075136 A1 Mar. 10, 2022

Related U.S. Application Data

(63) Continuation of application No. 16/759,417, filed as application No. PCT/EP2018/079317 on Oct. 25, 2018, now Pat. No. 11,175,469.

(Continued)

(51) Int. Cl.
*G02B 6/00* (2006.01)
*G02B 6/44* (2006.01)

(52) U.S. Cl.
CPC ......... *G02B 6/4452* (2013.01); *G02B 6/4455* (2013.01); *G02B 6/4457* (2013.01)

(58) Field of Classification Search
CPC .. G02B 6/4452; G02B 6/4455; G02B 6/4457; G02B 6/44; G02B 6/00
See application file for complete search history.

(56) References Cited

U.S. PATENT DOCUMENTS 4,708,430 A 11/1987 Donaldson et al.
4,792,203 A 12/1988 Nelson et al.
(Continued)

FOREIGN PATENT DOCUMENTS

CN 203287592 U 11/2013
CN 203825250 U 9/2014
(Continued)

OTHER PUBLICATIONS

International Search Report and Written Opinion of the International Searching Authority for International Patent Application No. PCT/EP2018/079317 dated Dec. 3, 2018, 14 pages.
(Continued)

*Primary Examiner* — Jennifer Doan
(74) *Attorney, Agent, or Firm* — Merchant & Gould P.C.

(57) ABSTRACT

A telecommunications system includes a chassis defining a first side and an opposite second side. A tray is pivotally mounted to the chassis between a closed storage position and an open access position relative to the chassis. At least one telecommunications component is removably mounted to the tray. One of an input or output cable from the telecommunications component extends out to an exterior of the chassis from the first side of the chassis, and the other of the input or output cable from the telecommunications component follows a cable path across the chassis, positioned above the pivotable tray, and extends out to the exterior of the chassis from the opposite second side of the chassis.

18 Claims, 10 Drawing Sheets

Related U.S. Application Data

(60) Provisional application No. 62/577,536, filed on Oct. 26, 2017.

(56) References Cited

U.S. PATENT DOCUMENTS

| | | |
|---|---|---|
| 4,912,615 A | 3/1990 | Bluband |
| 4,995,681 A | 2/1991 | Parnell |
| 5,142,606 A | 8/1992 | Carney et al. |
| 5,266,272 A | 11/1993 | Griner et al. |
| 5,339,379 A | 8/1994 | Kutsch et al. |
| 5,402,515 A | 3/1995 | Vidacovich et al. |
| 5,497,444 A | 3/1996 | Wheeler |
| 5,584,396 A | 12/1996 | Schmitt |
| 5,613,030 A | 3/1997 | Hoffer et al. |
| 5,689,606 A | 11/1997 | Hassan |
| 5,717,810 A | 2/1998 | Wheeler |
| 5,730,400 A | 3/1998 | Rinderer et al. |
| 5,740,299 A | 4/1998 | Llewellyn et al. |
| 5,758,003 A | 5/1998 | Wheeler et al. |
| 5,778,131 A | 7/1998 | Llewellyn et al. |
| 5,870,519 A | 2/1999 | Jenkins et al. |
| 5,946,440 A | 8/1999 | Puetz |
| 5,966,492 A | 10/1999 | Bechamps et al. |
| 6,160,946 A | 12/2000 | Thompson et al. |
| 6,234,240 B1 | 5/2001 | Cheon |
| 6,263,141 B1 | 7/2001 | Smith |
| 6,271,476 B1 | 8/2001 | Bobowick et al. |
| 6,272,009 B1 | 8/2001 | Buican et al. |
| 6,301,424 B1 | 10/2001 | Hwang |
| 6,326,547 B1 | 12/2001 | Saxby et al. |
| 6,363,200 B1 | 3/2002 | Thompson et al. |
| 6,418,264 B1 | 7/2002 | Hough et al. |
| 6,427,045 B1 | 7/2002 | Matthes et al. |
| 6,438,310 B1 | 8/2002 | Lance et al. |
| 6,442,022 B1 | 8/2002 | Paul |
| 6,504,988 B1 | 1/2003 | Trebesch et al. |
| 6,529,373 B1 | 3/2003 | Liao et al. |
| 6,538,879 B2 | 3/2003 | Jiang |
| 6,540,083 B2 | 4/2003 | Shih |
| 6,556,763 B1 | 4/2003 | Puetz et al. |
| 6,560,099 B1 | 5/2003 | Chang |
| 6,591,051 B2 | 7/2003 | Solheid et al. |
| 6,600,665 B2 | 7/2003 | Lauchner |
| 6,608,765 B2 | 8/2003 | Vier et al. |
| 6,631,237 B2 | 10/2003 | Knudsen et al. |
| RE38,311 E | 11/2003 | Wheeler |
| 6,693,802 B2 | 2/2004 | Vier et al. |
| 6,738,261 B2 | 5/2004 | Vier et al. |
| 6,760,531 B1 | 7/2004 | Solheid et al. |
| 6,771,872 B2 | 8/2004 | Wu et al. |
| 6,788,544 B1 | 9/2004 | Barsun et al. |
| 6,788,786 B1 | 9/2004 | Kessler et al. |
| 6,810,194 B2 | 10/2004 | Griffiths et al. |
| 6,850,685 B2 | 2/2005 | Tinucci et al. |
| 6,870,734 B2 | 3/2005 | Mertesdorf et al. |
| 6,902,069 B2 | 6/2005 | Hartman et al. |
| 6,920,274 B2 | 7/2005 | Rapp et al. |
| 6,925,241 B2 | 8/2005 | Bohle et al. |
| 6,944,383 B1 | 9/2005 | Herzog et al. |
| 6,944,387 B2 | 9/2005 | Howell et al. |
| 6,968,111 B2 | 11/2005 | Trebesch et al. |
| 7,070,459 B2 | 7/2006 | Denovich et al. |
| 7,079,744 B2 | 7/2006 | Douglas et al. |
| 7,086,539 B2 | 8/2006 | Knudsen et al. |
| 7,090,084 B2 | 8/2006 | Knudsen et al. |
| 7,102,884 B2 | 9/2006 | Mertesdorf et al. |
| 7,120,348 B2 | 10/2006 | Trebesch et al. |
| 7,139,461 B2 | 11/2006 | Puetz et al. |
| 7,142,765 B2 | 11/2006 | Rapp et al. |
| 7,149,398 B2 | 12/2006 | Solheid et al. |
| 7,231,125 B2 | 6/2007 | Douglas et al. |
| 7,302,154 B2 | 11/2007 | Trebesch et al. |
| 7,330,546 B2 | 2/2008 | Kessler et al. |
| 7,333,707 B2 | 2/2008 | Puetz et al. |
| 7,349,615 B2 | 3/2008 | Frazier et al. |
| 7,367,823 B2 | 5/2008 | Rapp et al. |
| 7,373,071 B2 | 5/2008 | Douglas et al. |
| RE40,358 E | 6/2008 | Thompson et al. |
| 7,408,769 B2 | 8/2008 | Mertesdorf et al. |
| 7,460,758 B2 | 12/2008 | Xin |
| 7,463,811 B2 | 12/2008 | Trebesch et al. |
| 7,473,846 B2 | 1/2009 | Doerr et al. |
| 7,478,730 B2 | 1/2009 | Knudsen et al. |
| 7,480,438 B2 | 1/2009 | Douglas et al. |
| 7,527,226 B2 | 5/2009 | Kusuda et al. |
| 7,555,193 B2 | 6/2009 | Rapp et al. |
| 7,589,277 B2 | 9/2009 | Kessler et al. |
| 7,664,361 B2 | 2/2010 | Trebesch et al. |
| 7,664,362 B2 | 2/2010 | Douglas et al. |
| RE41,460 E | 7/2010 | Wheeler |
| RE41,777 E | 9/2010 | Thompson et al. |
| 7,805,043 B2 | 9/2010 | Puetz et al. |
| 7,822,313 B2 | 10/2010 | Rapp et al. |
| 7,856,166 B2 | 12/2010 | Biribuze et al. |
| RE42,258 E | 3/2011 | Thompson et al. |
| 7,909,522 B2 | 3/2011 | Heaton et al. |
| 7,983,521 B2 | 7/2011 | Rapp et al. |
| 8,002,123 B2 | 8/2011 | Knudsen et al. |
| 8,019,191 B2 | 9/2011 | Laurisch |
| 8,019,192 B2 | 9/2011 | Puetz et al. |
| 8,078,029 B2 | 12/2011 | Douglas et al. |
| 8,078,030 B2 | 12/2011 | Trebesch et al. |
| 8,144,457 B2 | 3/2012 | Mertesdorf et al. |
| 8,315,498 B2 | 11/2012 | Redmann et al. |
| 8,331,752 B2 | 12/2012 | Biribuze et al. |
| 8,358,900 B2 | 1/2013 | Rapp et al. |
| 8,417,074 B2 | 4/2013 | Nhep et al. |
| 8,607,993 B2 | 12/2013 | Williams |
| 8,655,136 B2 | 2/2014 | Trebesch et al. |
| 8,768,134 B2 | 7/2014 | Puetz et al. |
| 8,879,881 B2 | 11/2014 | Cote et al. |
| 8,991,623 B2 | 3/2015 | Knudsen et al. |
| 9,057,859 B2 | 6/2015 | Solheid et al. |
| 9,069,150 B2 | 6/2015 | Solheid et al. |
| 9,081,164 B2 | 7/2015 | Badar et al. |
| 9,128,262 B2 | 9/2015 | Campbell et al. |
| 9,329,353 B2 | 5/2016 | Solheid et al. |
| 9,354,416 B2 | 5/2016 | Solheid et al. |
| 9,429,728 B2 | 8/2016 | Puetz et al. |
| 9,442,267 B2 | 9/2016 | Douglas et al. |
| 9,494,759 B2 | 11/2016 | Claessens et al. |
| 9,523,833 B2 | 12/2016 | Campbell et al. |
| 9,529,171 B2 | 12/2016 | Knudsen et al. |
| 9,581,781 B2 | 2/2017 | Takeuchi et al. |
| 9,664,870 B2 | 5/2017 | Trebesch et al. |
| 9,709,765 B2 * | 7/2017 | Wells .................. G02B 6/4452 |
| 9,715,075 B2 | 7/2017 | Solheid et al. |
| 9,810,868 B2 | 11/2017 | Puetz et al. |
| 9,810,869 B2 | 11/2017 | Campbell et al. |
| 9,823,432 B2 | 11/2017 | Alexi et al. |
| 9,829,666 B2 | 11/2017 | Ellison et al. |
| 9,958,630 B2 | 5/2018 | Claessens et al. |
| 10,025,055 B2 | 7/2018 | Mexi et al. |
| 10,031,304 B2 | 7/2018 | Hill et al. |
| 10,048,460 B2 | 8/2018 | Courchaine et al. |
| 10,054,751 B2 | 8/2018 | Knudsen et al. |
| 10,067,309 B2 | 9/2018 | Puetz et al. |
| 10,082,634 B2 | 9/2018 | Geling et al. |
| 10,094,996 B2 | 10/2018 | Cooke et al. |
| 10,146,023 B2 | 12/2018 | Douglas et al. |
| 10,175,440 B2 | 1/2019 | Alexi et al. |
| 10,209,470 B2 | 2/2019 | Geling et al. |
| 10,209,471 B2 | 2/2019 | Campbell et al. |
| 10,302,872 B2 | 5/2019 | Verheyden et al. |
| 10,459,182 B2 | 10/2019 | Trebesch et al. |
| 10,502,917 B2 | 12/2019 | Geens et al. |
| 10,509,190 B2 | 12/2019 | Alexi et al. |
| 10,545,306 B2 | 1/2020 | Geling et al. |
| 10,613,286 B2 | 4/2020 | Courchaine et al. |
| 10,627,591 B2 | 4/2020 | Geling et al. |
| 10,638,636 B1 | 4/2020 | Chen et al. |
| 10,670,821 B2 | 6/2020 | Claessens et al. |
| 10,678,010 B2 | 6/2020 | Solheid et al. |
| 11,002,932 B2 | 5/2021 | Alexi et al. |

(56) References Cited

U.S. PATENT DOCUMENTS

| | | | |
|---|---|---|---|
| 11,175,469 B2 * | 11/2021 | Vermeulen | G02B 6/4455 |
| 2002/0125800 A1 | 9/2002 | Knudsen et al. | |
| 2002/0159745 A1 | 10/2002 | Howell et al. | |
| 2002/0170726 A1 | 11/2002 | Mendoza | |
| 2002/0179485 A1 | 12/2002 | Shih | |
| 2002/0181922 A1 | 12/2002 | Xin et al. | |
| 2002/0191942 A1 | 12/2002 | Griffiths et al. | |
| 2003/0007767 A1 | 1/2003 | Douglas et al. | |
| 2003/0012007 A1 | 1/2003 | Vier et al. | |
| 2003/0026069 A1 | 2/2003 | Jiang | |
| 2003/0026084 A1 | 2/2003 | Lauchner | |
| 2003/0086675 A1 | 5/2003 | Wu et al. | |
| 2003/0095772 A1 | 5/2003 | Solheid et al. | |
| 2003/0165315 A1 | 9/2003 | Trebesch et al. | |
| 2003/0185535 A1 | 10/2003 | Tinucci et al. | |
| 2003/0202334 A1 | 10/2003 | Vier et al. | |
| 2003/0206406 A1 | 11/2003 | Vier et al. | |
| 2004/0074852 A1 | 4/2004 | Knudsen et al. | |
| 2004/0079711 A1 | 4/2004 | Hartman et al. | |
| 2004/0120681 A1 | 6/2004 | Bohle et al. | |
| 2004/0146266 A1 | 7/2004 | Solheid et al. | |
| 2004/0251220 A1 | 12/2004 | Mertesdorf et al. | |
| 2004/0258384 A1 | 12/2004 | Trebesch et al. | |
| 2005/0036277 A1 | 2/2005 | Kessler et al. | |
| 2005/0100301 A1 | 5/2005 | Solheid et al. | |
| 2005/0135768 A1 | 6/2005 | Rapp et al. | |
| 2005/0220436 A1 | 10/2005 | Mertesdorf et al. | |
| 2005/0232566 A1 | 10/2005 | Rapp et al. | |
| 2006/0118497 A1 | 6/2006 | Knudsen et al. | |
| 2006/0127027 A1 | 6/2006 | Douglas et al. | |
| 2006/0193590 A1 | 8/2006 | Puetz et al. | |
| 2006/0193591 A1 | 8/2006 | Rapp et al. | |
| 2006/0275008 A1 | 12/2006 | Xin | |
| 2007/0058918 A1 | 3/2007 | Trebesch et al. | |
| 2007/0075026 A1 | 4/2007 | Knudsen et al. | |
| 2007/0127201 A1 | 6/2007 | Mertesdorf et al. | |
| 2007/0201806 A1 | 8/2007 | Douglas et al. | |
| 2007/0221793 A1 | 9/2007 | Kusuda et al. | |
| 2007/0230889 A1 | 10/2007 | Sato et al. | |
| 2008/0063350 A1 | 3/2008 | Trebesch et al. | |
| 2008/0093101 A1 | 4/2008 | Kessler et al. | |
| 2008/0152416 A1 | 6/2008 | Heaton et al. | |
| 2008/0219634 A1 | 9/2008 | Rapp et al. | |
| 2008/0267573 A1 | 10/2008 | Douglas et al. | |
| 2009/0022467 A1 | 1/2009 | Puetz et al. | |
| 2009/0067800 A1 | 3/2009 | Vazquez et al. | |
| 2009/0129045 A1 | 5/2009 | Mertesdorf et al. | |
| 2009/0136196 A1 | 5/2009 | Trebesch et al. | |
| 2009/0148117 A1 | 6/2009 | Laurisch | |
| 2009/0180749 A1 | 7/2009 | Douglas et al. | |
| 2009/0257726 A1 | 10/2009 | Redmann et al. | |
| 2009/0270832 A1 | 10/2009 | Vancaillie et al. | |
| 2010/0003000 A1 | 1/2010 | Rapp et al. | |
| 2010/0012599 A1 | 1/2010 | Knudsen et al. | |
| 2010/0054681 A1 | 3/2010 | Biribuze et al. | |
| 2010/0129028 A1 | 5/2010 | Nhep et al. | |
| 2010/0195968 A1 | 8/2010 | Trebesch et al. | |
| 2010/0202744 A1 | 8/2010 | Douglas et al. | |
| 2011/0038591 A1 | 2/2011 | Rapp et al. | |
| 2011/0058784 A1 | 3/2011 | Puetz et al. | |
| 2011/0085776 A1 | 4/2011 | Biribuze et al. | |
| 2011/0268413 A1 | 11/2011 | Cote et al. | |
| 2011/0286712 A1 | 11/2011 | Puetz et al. | |
| 2011/0297629 A1 | 12/2011 | Knudsen et al. | |
| 2011/0317973 A1 | 12/2011 | Rapp et al. | |
| 2012/0076466 A1 | 3/2012 | Douglas et al. | |
| 2012/0093475 A1 | 4/2012 | Trebesch et al. | |
| 2013/0170810 A1 | 7/2013 | Badar et al. | |
| 2013/0287356 A1 | 10/2013 | Solheid et al. | |
| 2013/0287357 A1 | 10/2013 | Solheid et al. | |
| 2013/0322839 A1 | 12/2013 | Claessens et al. | |
| 2014/0119704 A1 | 5/2014 | Ciechomski et al. | |
| 2014/0133819 A1 | 5/2014 | Trebesch et al. | |
| 2014/0153892 A1 | 6/2014 | Puetz et al. | |
| 2014/0248028 A1 | 9/2014 | Campbell et al. | |
| 2014/0376870 A1 | 12/2014 | Takeuchi et al. | |
| 2015/0234142 A1 | 8/2015 | Courchaine et al. | |
| 2015/0286025 A1 | 10/2015 | Douglas et al. | |
| 2015/0293323 A1 | 10/2015 | Solheid et al. | |
| 2015/0301301 A1 | 10/2015 | Mullaney | |
| 2015/0309280 A1 | 10/2015 | Knudsen et al. | |
| 2015/0338596 A1 | 11/2015 | Solheid et al. | |
| 2016/0047999 A1 | 2/2016 | Alexi et al. | |
| 2016/0103289 A1 | 4/2016 | Campbell et al. | |
| 2016/0124160 A1 | 5/2016 | Verheyden et al. | |
| 2016/0186895 A1 | 6/2016 | Chen | |
| 2016/0238812 A1 | 8/2016 | Solheid et al. | |
| 2017/0115462 A1 | 4/2017 | Puetz et al. | |
| 2017/0131507 A1 | 5/2017 | Douglas et al. | |
| 2017/0146762 A1 | 5/2017 | Campbell et al. | |
| 2017/0227728 A1 | 8/2017 | Claessens et al. | |
| 2017/0235077 A1 | 8/2017 | Knudsen et al. | |
| 2017/0276892 A1 | 9/2017 | Geling et al. | |
| 2017/0276893 A1 | 9/2017 | Geling et al. | |
| 2017/0293099 A1 | 10/2017 | Alexi et al. | |
| 2017/0351046 A1 | 12/2017 | Trebesch et al. | |
| 2018/0081140 A1 | 3/2018 | Douglas et al. | |
| 2018/0120528 A1 | 5/2018 | Puetz et al. | |
| 2018/0129006 A1 | 5/2018 | Solheid et al. | |
| 2018/0136422 A1 | 5/2018 | Alexi et al. | |
| 2018/0188466 A1 | 7/2018 | Campbell et al. | |
| 2018/0231730 A1 | 8/2018 | Geens et al. | |
| 2018/0329165 A1 | 11/2018 | Claessens et al. | |
| 2018/0348462 A1 | 12/2018 | Courchaine et al. | |
| 2018/0364435 A1 | 12/2018 | Geling et al. | |
| 2019/0004269 A1 | 1/2019 | Alexi et al. | |
| 2019/0137715 A1 | 5/2019 | Knudsen et al. | |
| 2019/0187395 A1 | 6/2019 | Solheid et al. | |
| 2019/0250352 A1 | 8/2019 | Geling et al. | |
| 2019/0250353 A1 | 8/2019 | Campbell et al. | |
| 2019/0361189 A1 | 11/2019 | Douglas et al. | |
| 2020/0018905 A1 | 1/2020 | Verheyden et al. | |
| 2020/0081216 A1 | 3/2020 | Takeuchi et al. | |
| 2020/0110238 A1 | 4/2020 | Geens et al. | |
| 2020/0174213 A1 | 6/2020 | Douglas et al. | |
| 2020/0233169 A1 | 7/2020 | Geling et al. | |

FOREIGN PATENT DOCUMENTS

| | | |
|---|---|---|
| DE | 43 29 184 A1 | 3/1995 |
| DE | 44 13 136 C1 | 5/1995 |
| EP | 0 215 668 A2 | 3/1987 |
| EP | 0 293 183 A2 | 11/1988 |
| EP | 0 594 913 A1 | 5/1994 |
| EP | 1 203 974 A2 | 5/2002 |
| EP | 1 693 694 A1 | 8/2006 |
| EP | 2 159 617 A2 | 3/2010 |
| EP | 2 677 357 A1 | 12/2013 |
| EP | 2 772 780 A1 | 9/2014 |
| EP | 2 775 334 A1 | 9/2014 |
| FR | 2 959 383 A1 | 10/2011 |
| WO | 02/19005 A2 | 3/2002 |
| WO | 02/21182 A1 | 3/2002 |
| WO | 02/071767 A2 | 9/2002 |
| WO | 2008/149131 A2 | 12/2008 |
| WO | 2011/100613 A2 | 8/2011 |
| WO | 2014/124001 A2 | 8/2014 |
| WO | 2016/005291 A1 | 1/2016 |
| WO | 2016/042018 A2 | 3/2016 |
| WO | 2016/042029 A1 | 3/2016 |
| WO | 2016/042034 A1 | 3/2016 |

OTHER PUBLICATIONS

ADC Telecommunications, Inc., FL2000 Products Catalog, Literature No. 803, front cover, table of contents, pp. 1-32, rear cover (Dec. 2000).

ADC Telecommunications, Inc., Next Generation Frame Product Family Ordering Guide, Literature No. 820, front cover, table of contents, pp. 1-43, rear cover (Apr. 2002).

* cited by examiner

TELECOMMUNICATIONS SYSTEM

CROSS-REFERENCE TO RELATED APPLICATION

This application is a Continuation of U.S. patent application Ser. No. 16/759,417, filed on Apr. 27, 2020, now U.S. Pat. No. 11,175,469, which is a National Stage Application of PCT/EP2018/079317, filed on Oct. 25, 2018, which claims the benefit of U.S. Patent Application Ser. No. 62/577,536, filed on Oct. 26, 2017, the disclosures of which are incorporated herein by reference in their entireties. To the extent appropriate, a claim of priority is made to each of the above disclosed applications.

BACKGROUND

As demand for telecommunications increases, fiber optic networks are being extended in more and more areas. Ease of installation of the telecommunications devices, management of the cables extending therefrom, and ease of accessibility for later management are important concerns. As a result, there is a need for fiber optic devices which address these and other concerns.

SUMMARY

An aspect of the present disclosure relates to a telecommunications system for mounting telecommunications devices in the form of fiber optic devices and for managing cables being input and output from the fiber optic devices. According to one example embodiment, the telecommunications system is a drawer-based system defined by a rack-mountable chassis and a tray pivotally mounted thereto. According to one embodiment, the tray houses fiber optic devices or components in the form of fiber optic splitters. Input and output cables extending from the fiber optic devices are managed within the chassis so as to limit the amount of pull on the cables when the tray is pivoted between closed and open positions.

According to another example aspect, the disclosure is directed to a telecommunications system. The telecommunications system may be a drawer-based system and include a chassis defining a first side and an opposite second side. A tray is pivotally mounted to the chassis between a closed storage position and an open access position relative to the chassis. At least one telecommunications component is removably mounted to the tray. One of an input or output cable from the telecommunications component extends out to an exterior of the chassis from the first side of the chassis, and the other of the input or output cable from the telecommunications component follows a cable path across the chassis, positioned above the pivotable tray, and extends out to the exterior of the chassis from the opposite second side of the chassis.

According to certain embodiments, the chassis may be configured for mounting on a standard 19-inch telecommunications rack.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

The present disclosure is directed generally to telecommunications systems. More specifically, referring to FIGS. 1-2, the present disclosure is directed to a telecommunications system 10 for removably mounting telecommunications devices or components 12 to a telecommunications rack and for managing input and output cables extending from such devices 12 within the system 10. According to one example embodiment, the telecommunications devices 12 are fiber optic devices, wherein such devices can include fiber optic splitters.

The system 10 may be used to mount (and provide access to) the fiber optic devices 12 on a standard 19-inch telecommunications rack. The system 10 may be modified to fit other sized racks.

According to the depicted example, the telecommunications system 10 is configured to occupy a height of one standard unit of rack space (1RU) in a standard 19-inch rack. Other configurations of the system 10 are possible depending upon the desired or allowed density.

Figure 1:
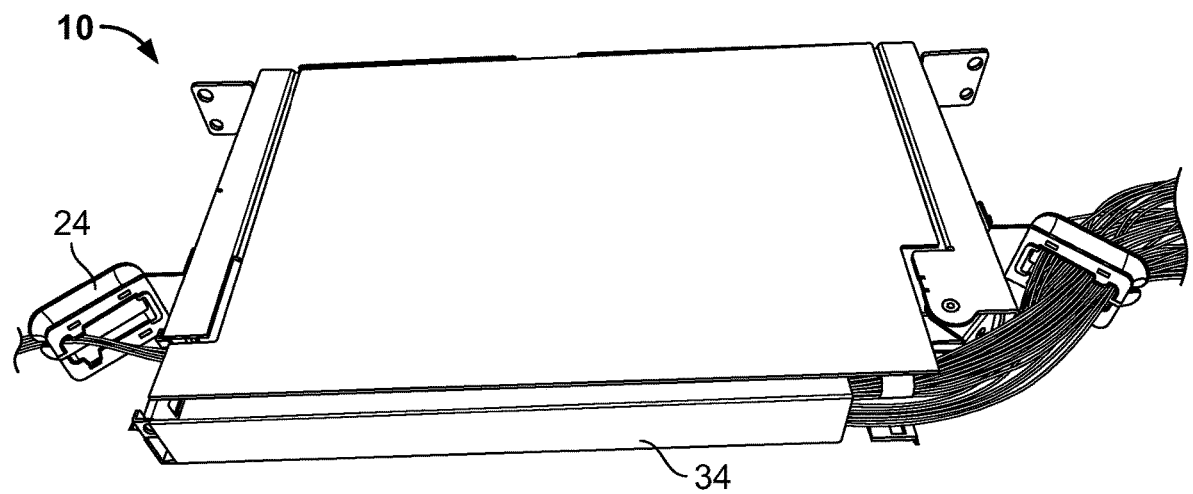
FIG. 1 is a perspective view illustrating a telecommunications system having features that are examples of inventive aspects in accordance with the present disclosure in a closed position.
Figure 2:
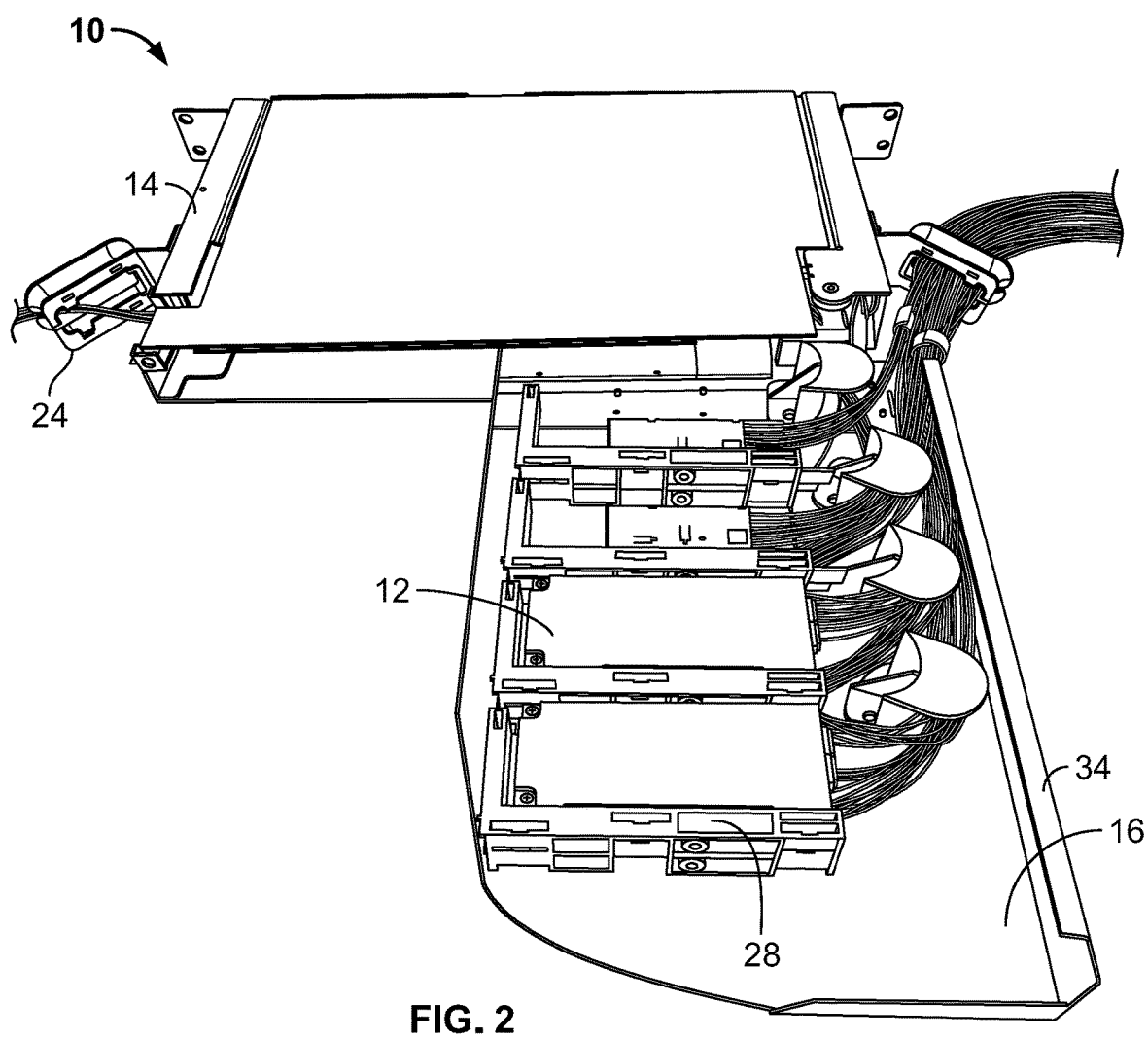
FIG. 2 illustrates the telecommunications system of FIG. 1 with the tray of the system in a pivoted open position with respect to the chassis of the system.

As shown in FIGS. 1-2, according to the depicted embodiment, the system 10 is a drawer-based system including a chassis 14 and a tray 16 pivotally mounted to the chassis 14 between a closed storage position and an open access position. FIG. 1 illustrates the telecommunications system 10 in the closed storage position, and FIG. 2 illustrates the telecommunications system 10 in the open access position for accessing the telecommunications devices 12 mounted within the system 10.

Still referring to FIGS. 1-2, the chassis 14 defines a first side 18 (e.g., right side) and an opposing second side 20 (e.g., left side). The chassis 14 defines rack-mount structures 22 on each of the first and second sides 18, 20 for mounting the chassis 14 to a telecommunications rack, as noted above.

At each of the first and second sides 18, 20, the system 10 includes a cable management structure 24 for managing cables coming into or going outside the chassis 14. In the depicted embodiment, the cable management structures 24 are provided in the form of split-rings that allow lateral insertion of cables thereinto.

As shown in FIG. 2, the tray 16 is pivotally mounted to the chassis 14 via a hinge structure 26 located at the first (right) side 18 of the chassis 14. It should be noted that the configuration of the system 10 can be reversed and the hinge 26 can be positioned at the second (left) side 20 of the chassis 14.

The tray 16 houses a plurality of the telecommunications devices (e.g., fiber optic splitters) 12. The devices 12 may be removably mounted to mounts 28 provided in the tray 16. Each device 12 includes one or more cables 30 extending into the device 12 that carry an input signal (e.g., input cables). Each device 12 also includes one or more cables 32 extending from the device 12 that carry an output signal (e.g., output cables). As noted above, the devices 12 may be fiber optic splitters and the input and output cables 30, 32 may be optical cables carrying optical fibers.

The devices 12 are positioned within the tray 16 in a parallel relationship where the input and output cables 30, 32 extend from the devices 12 in a back-to-front direction toward a front 34 of the tray 16.

As shown in FIG. 2, each device 12 also includes an associated cable manager 36 mounted within the tray 16. The cable managers 36 are provided in the form of spools. The cable managers 36 are positioned and shaped to lead the input and output cables 30, 32 extending from the devices 12 toward the hinge 26.

Telecommunications devices such as fiber optic splitters similar to those devices 12 discussed and illustrated herein and associated cable managers similar to those cable managers 36 discussed and illustrated herein are described in further detail in International Publication No. WO 2016/005291, the entirety of which is incorporated herein by reference.

Figure 3:
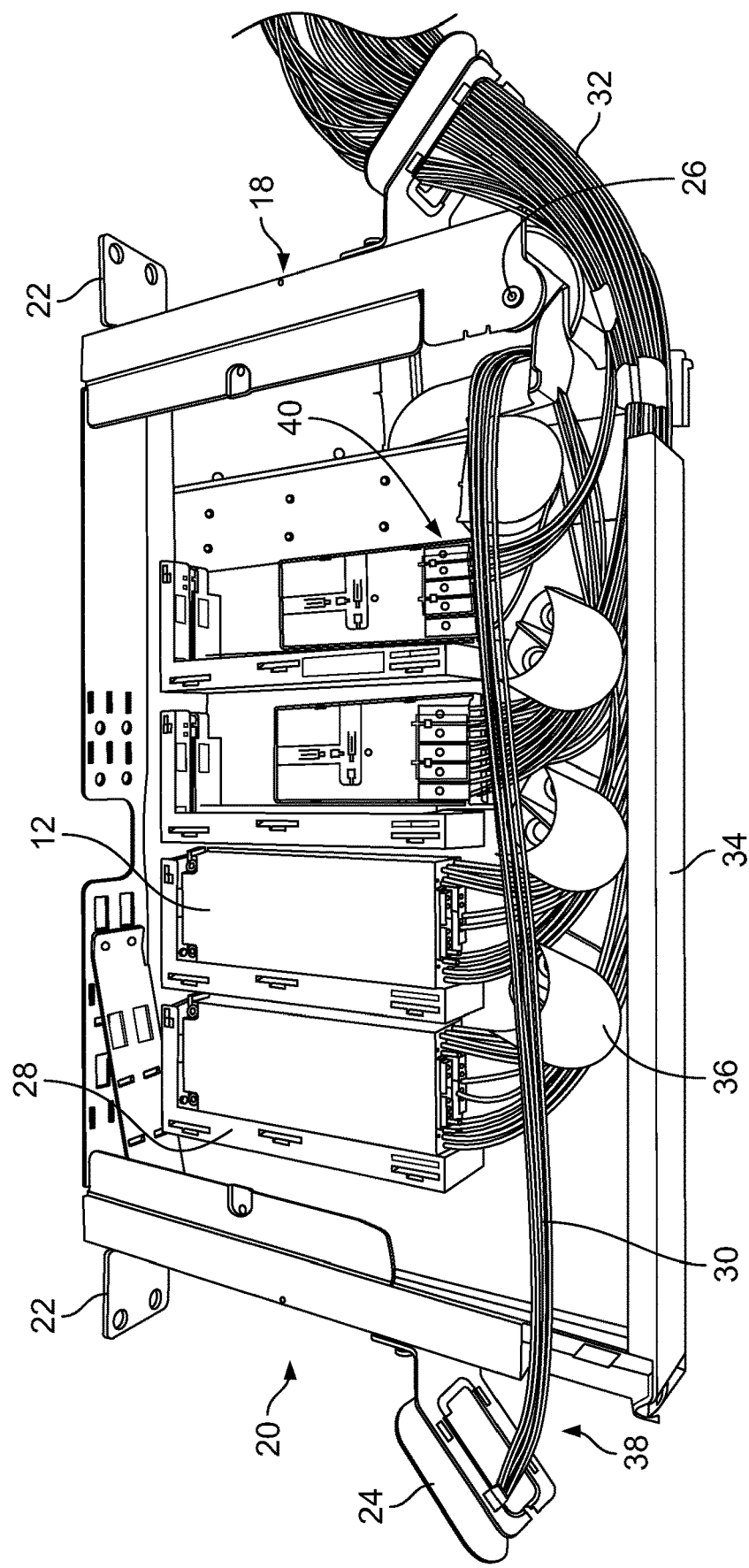
FIG. 3 illustrates the telecommunications system of FIG. 1 with the cover of the chassis removed to illustrate the internal features.
Figure 4:
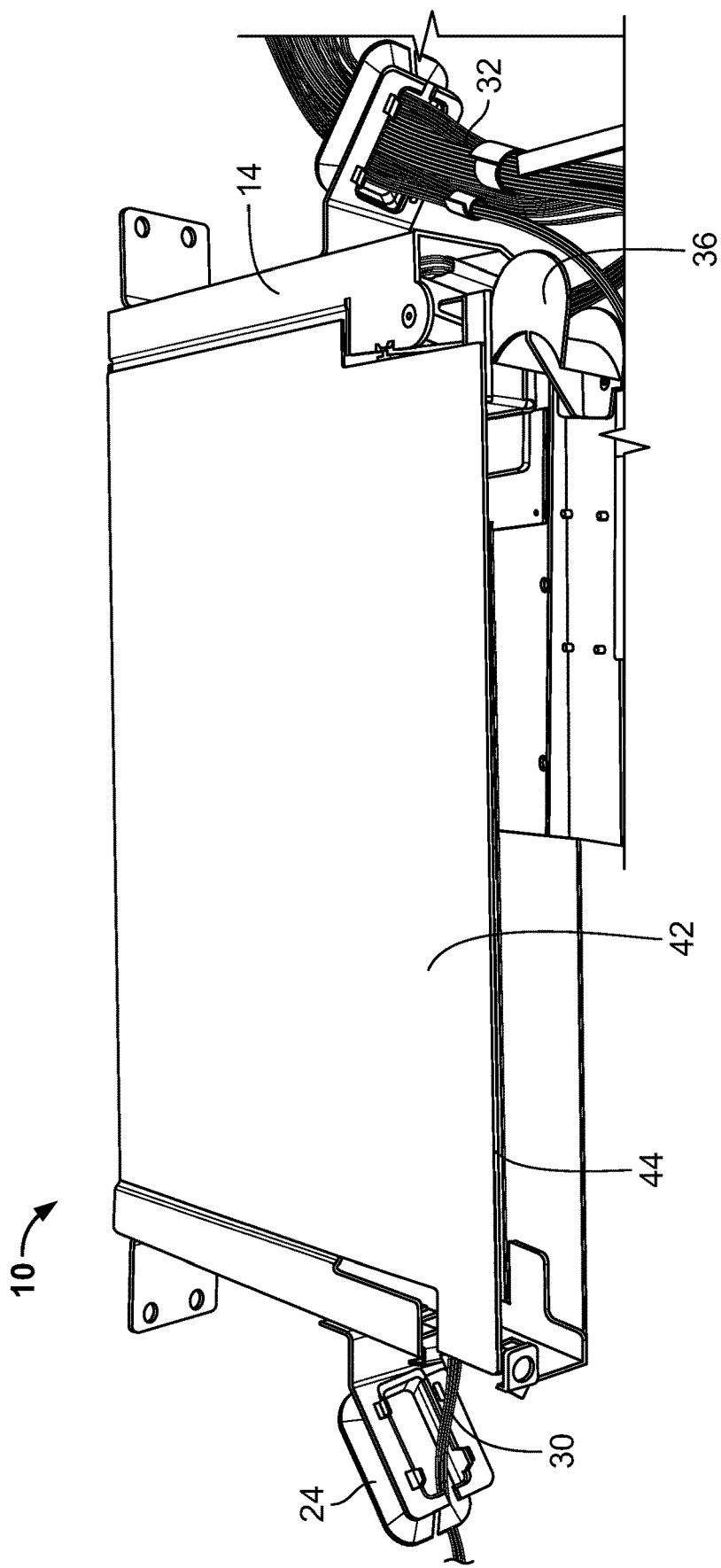
FIG. 4 is a close-up view of the telecommunications system of FIG. 2 illustrating the cable management trough provided on the cover of the chassis.
Figure 5:
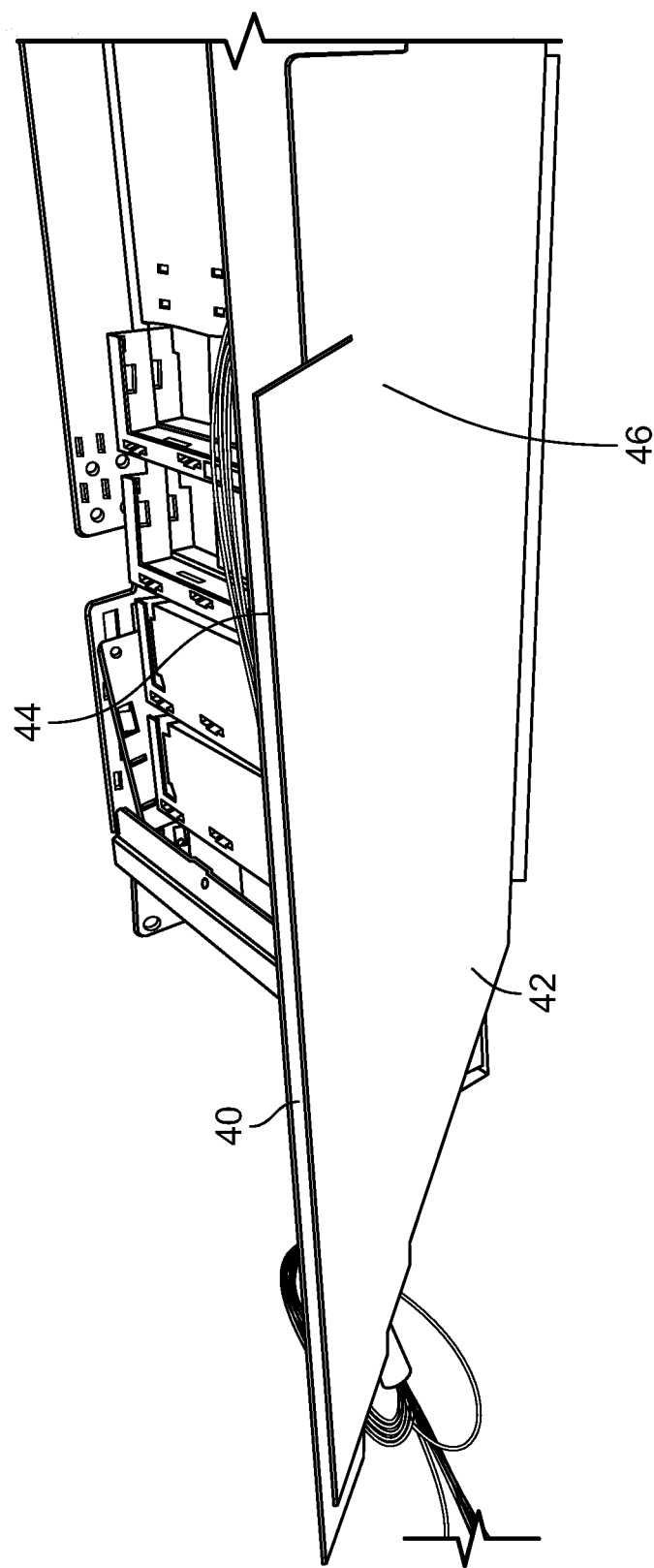
FIG. 5 is a perspective view of the cover of the chassis in isolation illustrating the cable management trough at the underside of the cover.
Figure 6:
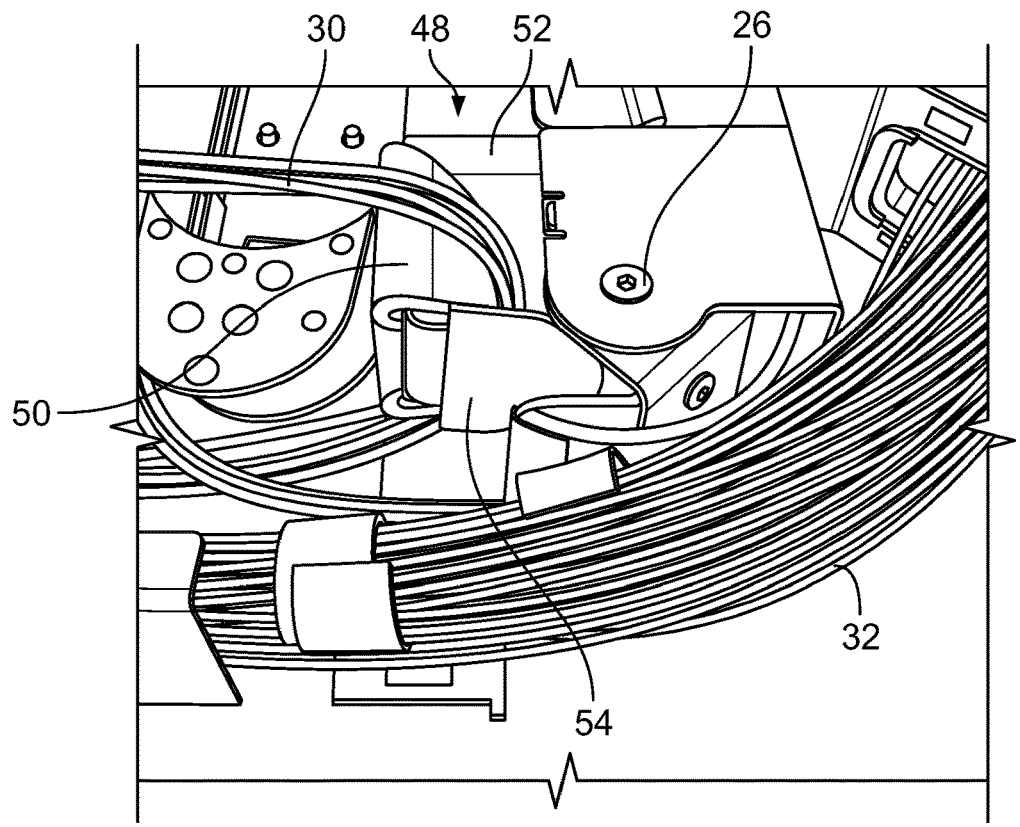
FIGS. 6-9 illustrate the position of the input and output cables extending from the telecommunications devices mounted within the chassis of FIGS. 1-2 as the tray of the system is rotated from a closed position to an open position with respect to the chassis.
Figure 7:
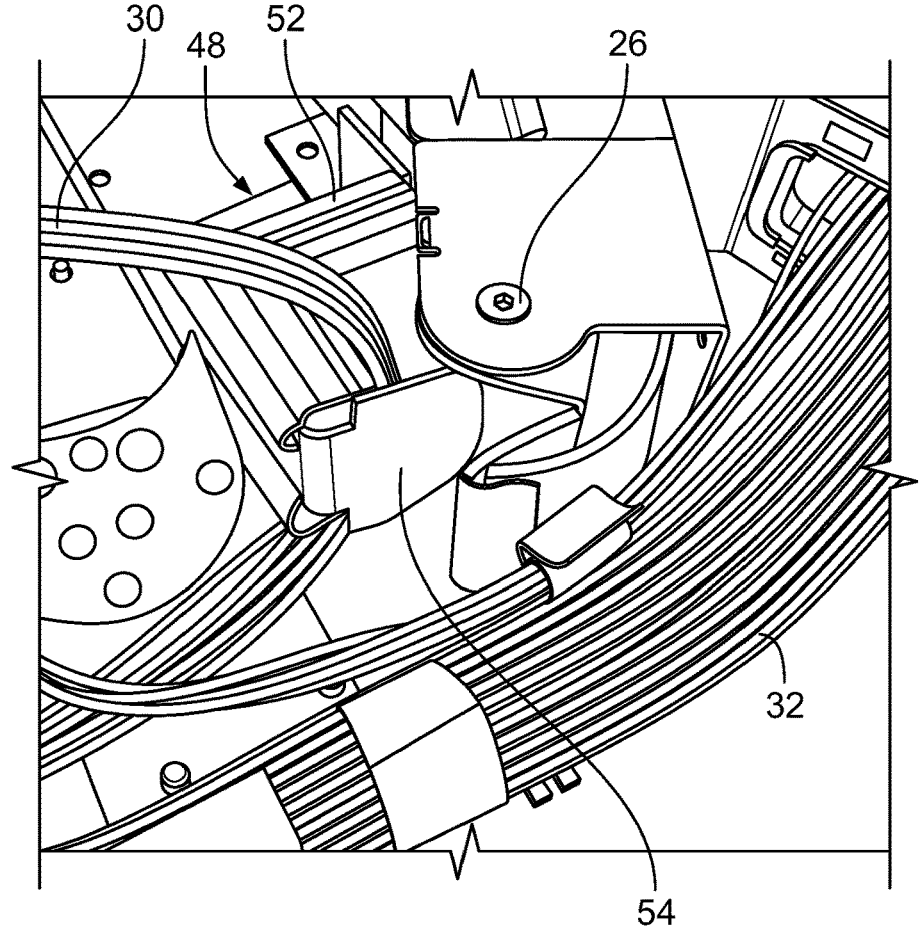
Figure 8:
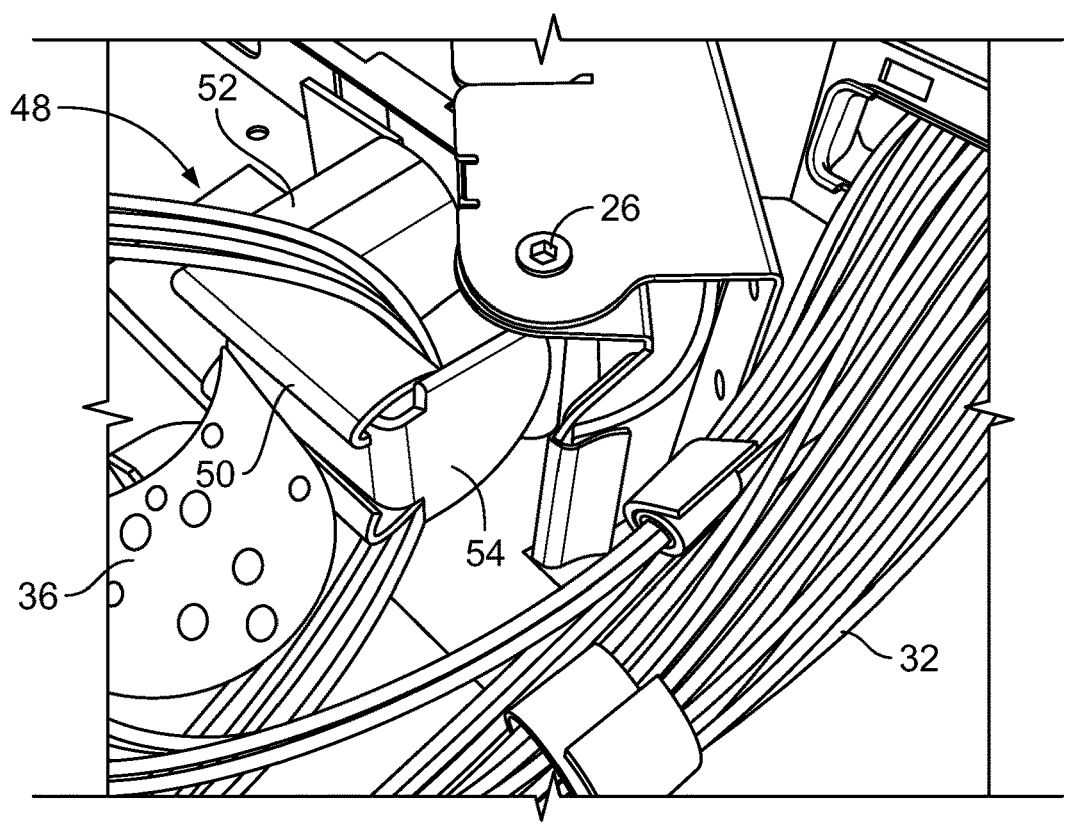
Figure 9:
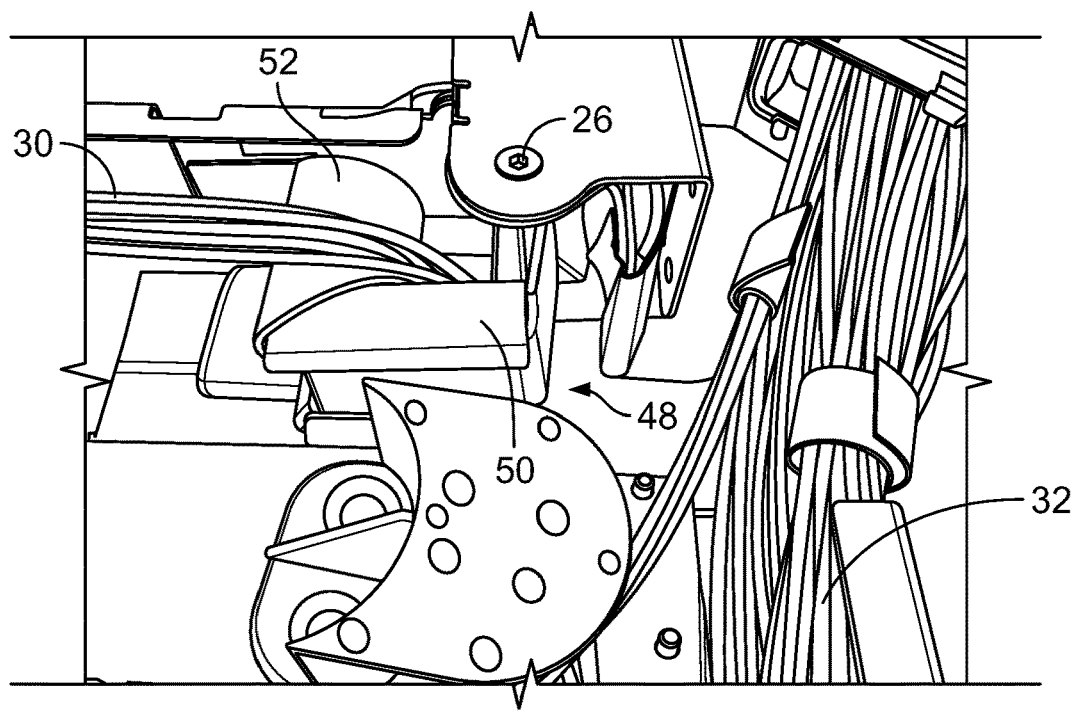

Referring now to FIGS. 3-5, as shown, the system 10 is designed such that one of the input or output cable(s) 30, 32 from the telecommunications devices 12 extends out to an exterior 38 of the chassis 14 from the right side 18 of the chassis 14, and the other of the input and output cable(s) 30, 32 from the telecommunications devices 12 follows a cable path 40 across the chassis 14, positioned above the pivotable tray 16, extending out to the exterior 38 of the chassis 14 from the opposite left side 20 of the chassis 14.

In the depicted embodiment, the output cables 32 extend from the devices 12, around the spools 36, toward the hinge 26, and out of the tray 16 to the cable management structure 24 in the form of a split-ring provided at the right side 18 of the chassis 14. As noted above, the positioning of the split-ring 24 adjacent the hinge 26 allows pivotability of the tray 16 without extensive pulling on the output cables 32 as the tray 16 is moved between closed and open positions.

And, in the depicted embodiment, the input cables 30 of the devices 12 are the cables that extend across the chassis 14 and to the exterior 38 of the chassis 14 from the opposite left side 20 of the chassis 14.

FIG. 3 illustrates the telecommunications system 10 with a cover 42 of the chassis 14 removed to illustrate the cable path 40 for the input cables 30. As shown and as noted above, the cable path 40 is positioned above the pivotable tray 16 so as to not interfere with the motion of the tray 16.

Referring now to FIGS. 4-5, the input cables 30 extending across the chassis 14 are positioned within a trough 44 defined by the cover 42 of the chassis 14. An underside 46 of the cover 42 is shown in FIG. 5 to illustrate the trough 44 for placement of the input cables 30 that extend across the chassis 14. The trough 44 provides a way to fix the input cables 30 as the cables 30 extend from the first side 18 of the chassis 14 to the second side 20 and keeps the input cables 30 out of the way of the tray 16 during pivotal movement of the tray 16. Even though the depicted embodiment of the system 10 provides a fixation method in the form of a trough 44 positioned underneath the cover 42 of the chassis 14, other fixation methods such as cable loops, ties, clamps, etc. may be used to fix the input cables 30 and keep them from interfering with the movement of the tray 16.

Now referring to FIGS. 6-9, a cable manager 48 that is mounted to the tray 16 adjacent the hinge 26 is illustrated in detail. The cable manager 48 is positioned and configured to limit pulling or snag on the input cables 30 during pivotal movement of the tray 16. The cable manager 48 provides a cable holding or retention point for the input cables 30 extending from the devices 12 before these cables 30 are led across the chassis 14. Due to the positioning of the cable manager 48 close to the hinge 26 of the tray 16, a portion of the input cables 30 extending from the devices 12 are kept close to the pivot point of the tray 16 for reducing snag on those cables 30, similar to the positioning of the output cables 32 that are led out of the tray 16.

Still referring to FIGS. 6-9, the cable manager 48 is provided such that it pivots with the tray 16. The cable manager 48 defines two bend radius limiting portions 50, 52 disposed perpendicularly to each other so as to define an L-shaped structure. As shown in FIGS. 6-9, a first bend radius limiting portion 50 of the two portions is configured to contact the input cables 30 when the tray 16 is in the closed position and a second bend radius limiting portion 52 of the two portions is configured to contact the input cables 30 when the tray 16 is in the open position. Thus, during pivotal movement of the tray 16, the L-shaped configuration of the cable manager 48 allows the input cables 30 to stay in contact with at least one of the two bend radius limiting portions 50, 52.

As shown, the cable manager 48 also defines a cable retention portion 54 for keeping the input cables 30 in contact with at least one of the two bend radius limiting portions 50, 52 after the input cables 30 have been routed onto the cable manager 48.

Referring now to FIGS. 10-17, the steps involved in mounting an example telecommunications device 12 to the tray 16 including the positioning of the input and output cables 30, 32 extending from the device 12 on the various cable management features of the system 10 is illustrated in detail.

Figure 10:
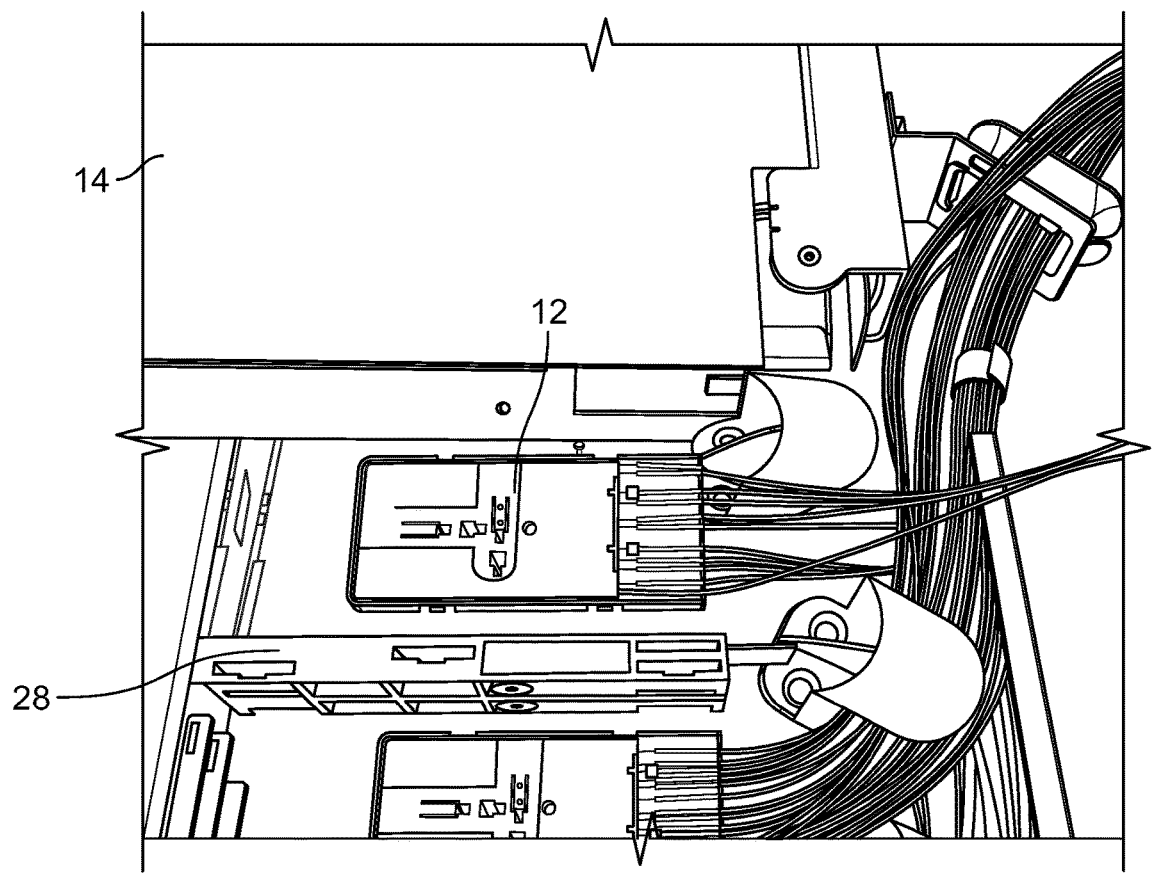
FIGS. 10-17 illustrate the steps involved in mounting a telecommunications device to the tray of the system of FIGS. 1-2, including the positioning of the input and output cables extending from the device on the various cable management features of the system.
Figure 11:
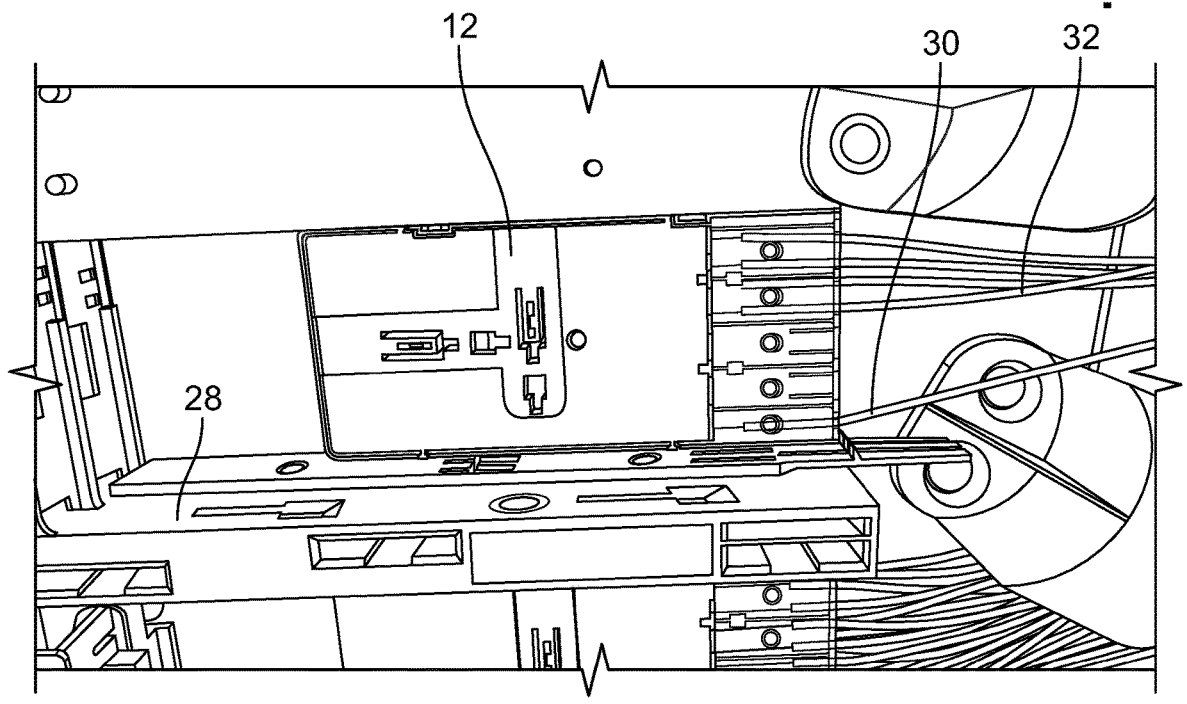

Referring specifically to FIGS. 10 and 11, first, the device 12 is mounted to a respective mount 28 provided in the tray 16. The device 12 may be removably mounted to the mount 28 via a dovetail locking arrangement as described in further detail in International Publication No. WO 2016/005291, previously incorporated herein by reference.

Figure 12:
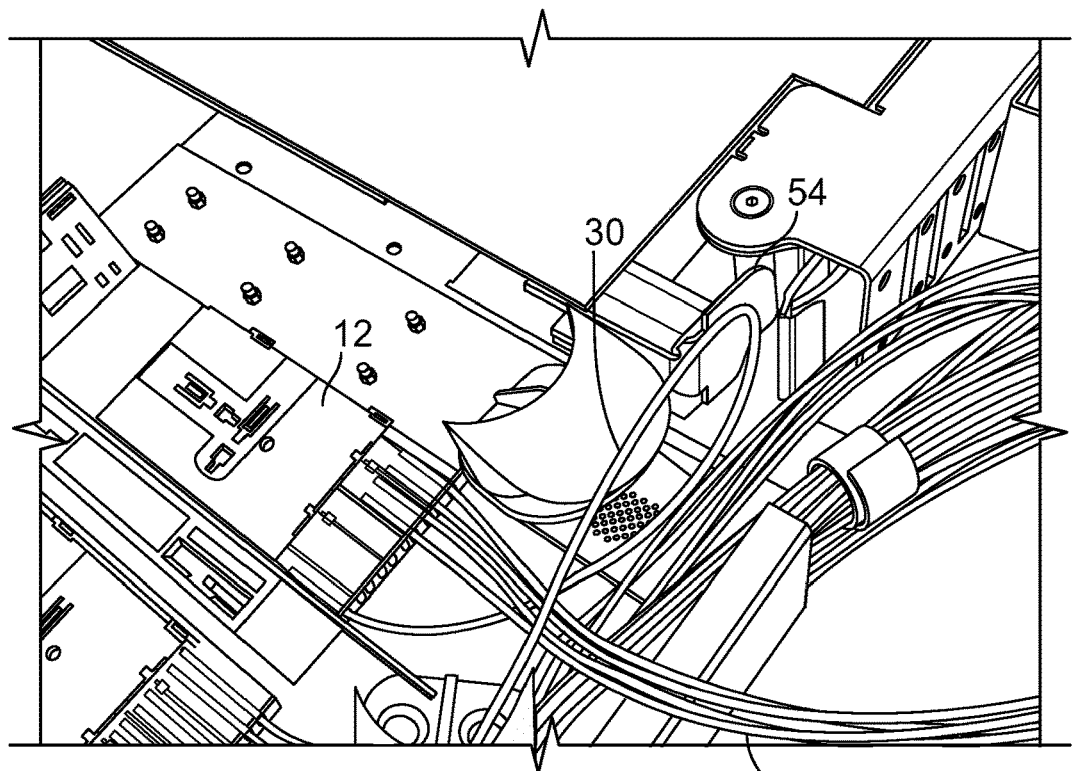
Figure 13:
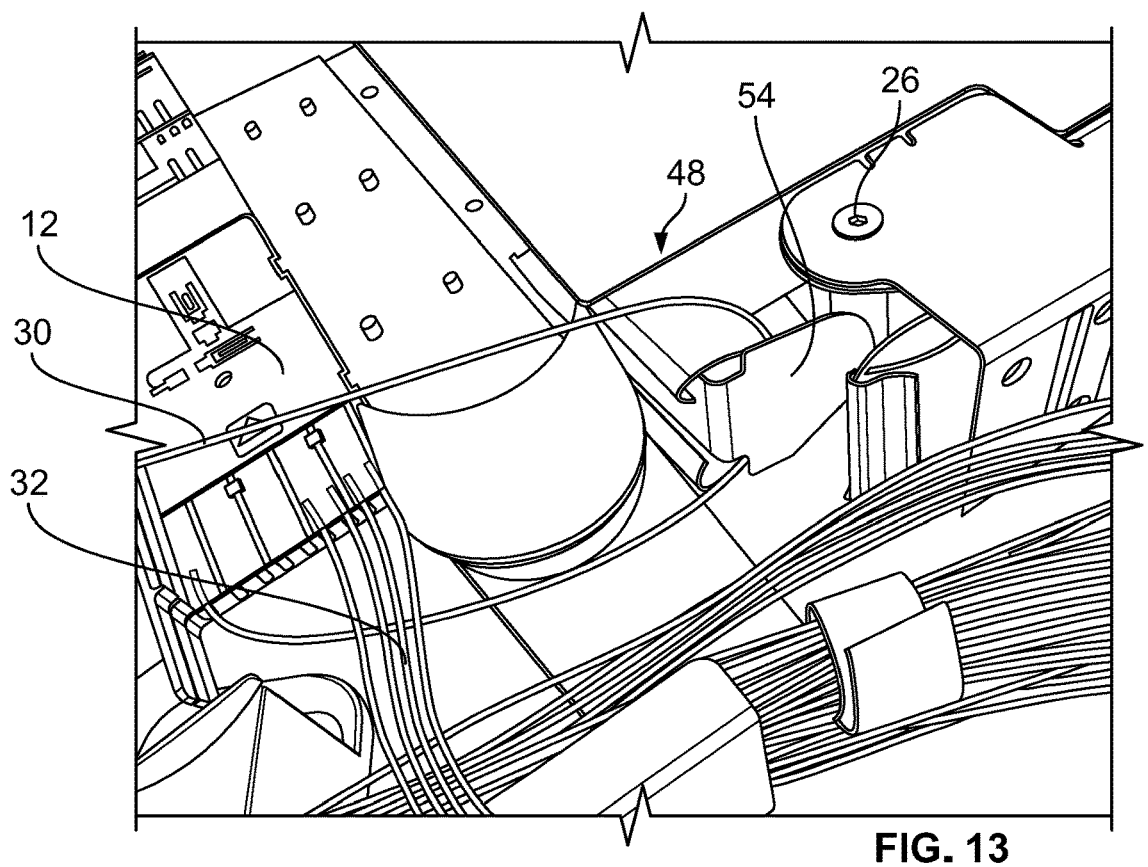

Now referring to FIGS. 12 and 13, one of the input cables 30 extending from the device 12 is routed under the output cables 32 and looped onto the cable manager 48. The cable retention portion 54 of the cable manager 48 keeps the input cable 30 on the cable manager 48.

Figure 14:
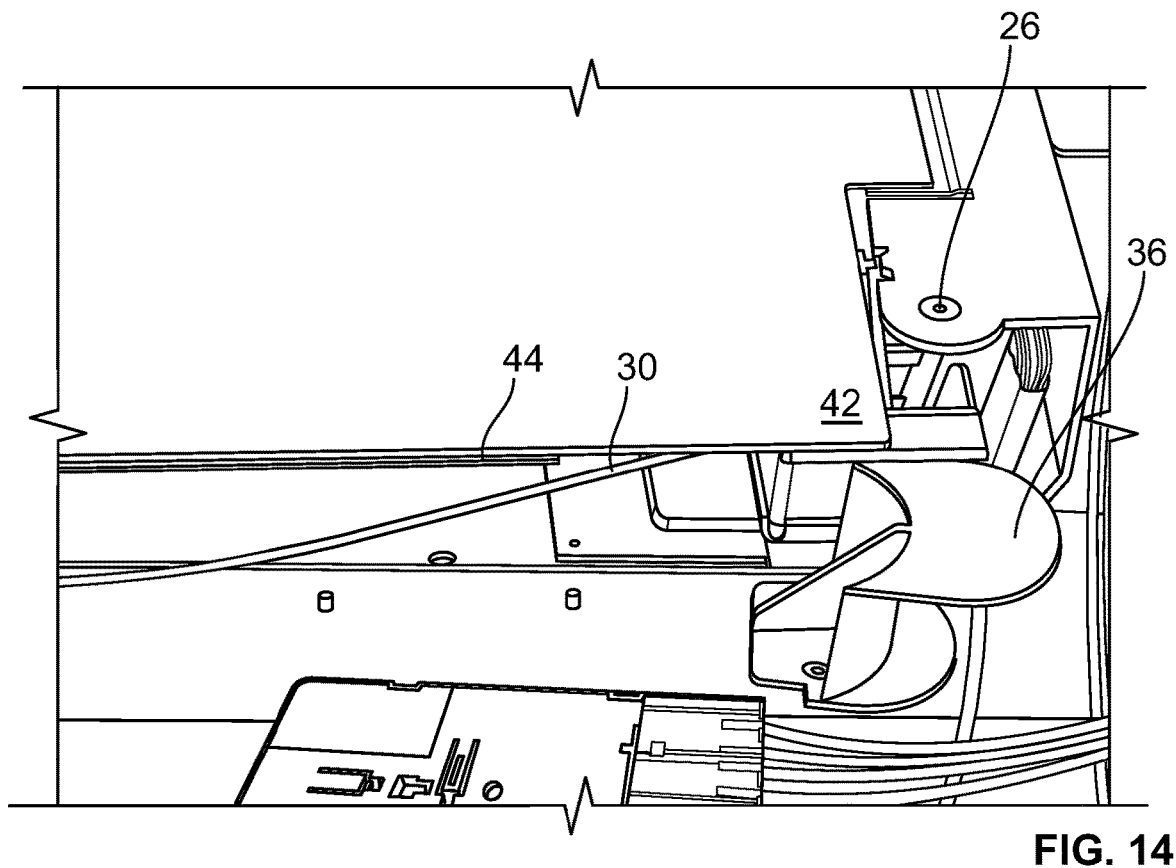
Figure 15:
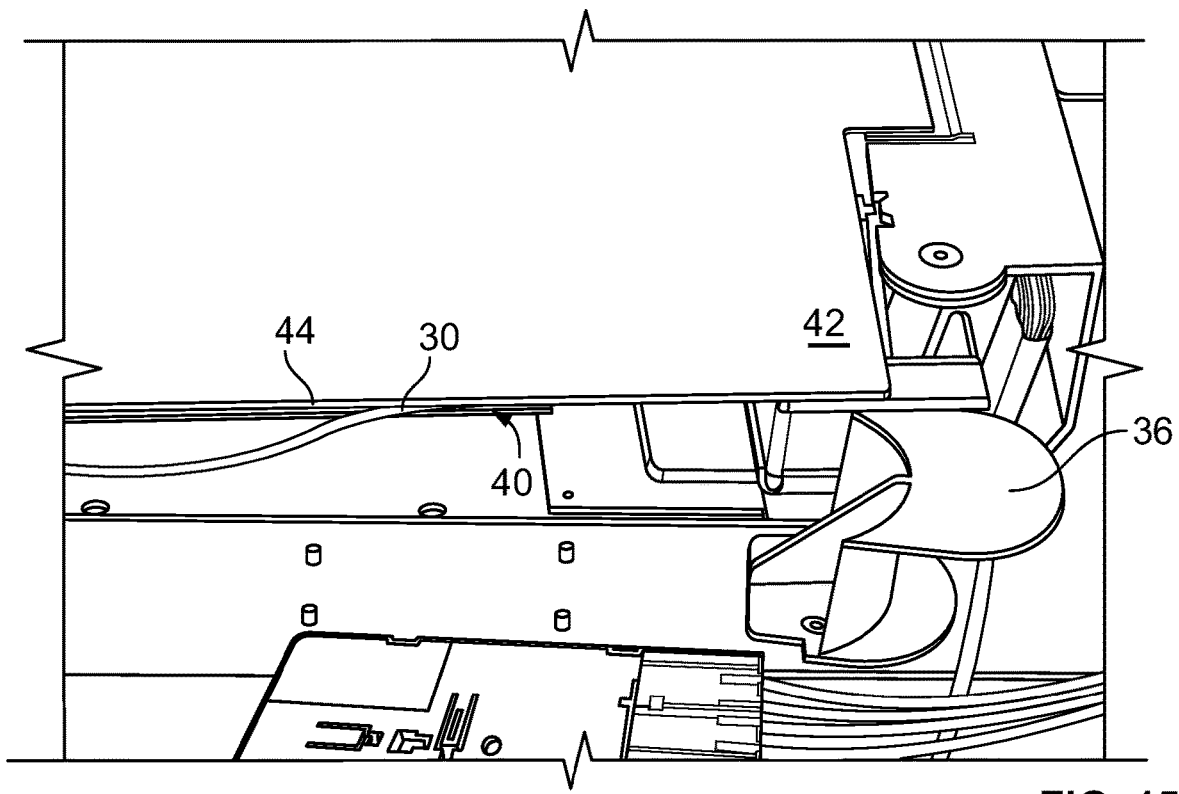

Referring to FIGS. 14 and 15, the input cable 30 is then led across the chassis 14 to the second side 20 of the chassis 14, positioning and fixing a portion of the input cable 30 within the trough 44 defined by the cover 42 of the chassis 14.

Figure 16:
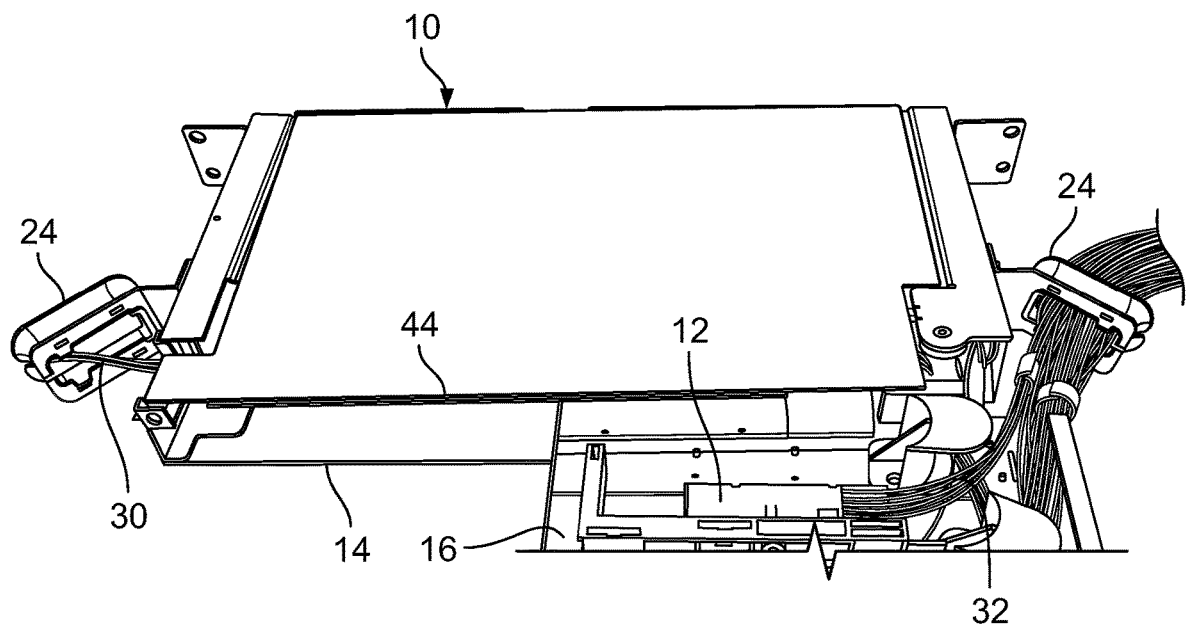

Referring to FIG. 16, the input cable 30 is then directed out of the chassis 14 and inserted into the split-ring cable management structure 24 provided at the second side 20 of the chassis 14.

Figure 17:
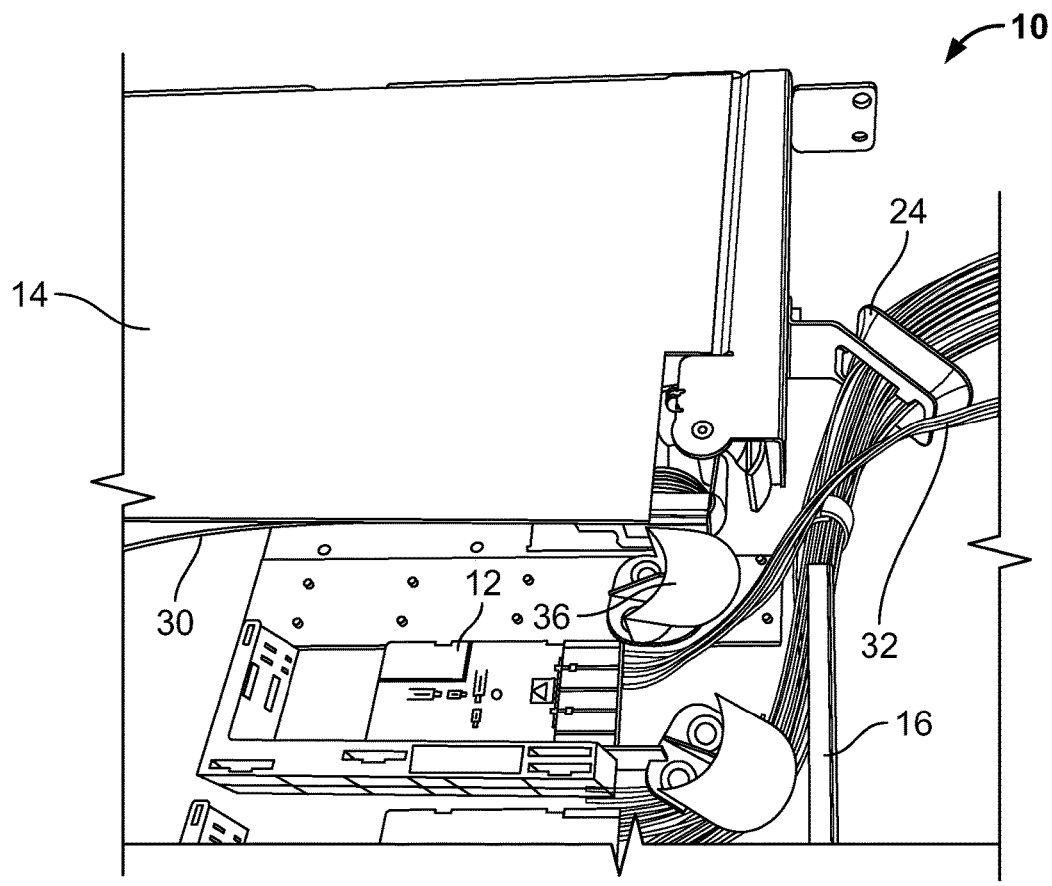

FIG. 17 illustrates the output cables 32 being directed from the device 12, around the respective cable manager 36 within the tray 16, and out of the tray 16 from the first side 18 of the chassis 14. Once the output cables 32 are outside the chassis 14, the output cables 32 are inserted into the split-ring cable management structure 24 provided at the first side 18 of the chassis 14.

A similar procedure may be followed for each of the devices 12 to be housed by the system 10 and for each of the respective input and output cables 30, 32 extending from the devices 12.

As noted above, the system 10 is designed to limit pulling or snag on the cables 30, 32 around the chassis 14 during pivotal movement of the tray 16 and keep cables 30, 32 out of the pivotal path of the tray 16.

Although in the foregoing description, terms such as "top," "bottom," "front," "back," "right," "left," "upper," and "lower" were used for ease of description and illustration, no restriction is intended by such use of the terms. The telecommunications systems described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

LIST OF REFERENCE NUMERALS AND CORRESPONDING FEATURES

10—Telecommunications system
12—Fiber optic devices/components
14—Chassis
16—Tray
18—First (right) side of the chassis
20—Second (left) side of the chassis
22—Rack mount structure
24—Cable management structure
26—Hinge
28—Mount
30—Input cable
32—Output cable
34—Front of the tray
36—Cable manager
38—Exterior of the chassis
40—Cable path
42—Cover of chassis
44—Trough
46—Underside of cover
48—Cable manager
50—First bend radius limiting portion of cable manager
52—Second bend radius limiting portion of cable manager
54—Cable retention portion of cable manager

The invention claimed is:

1. A telecommunications system comprising:
a chassis defining a first side, an opposite second side, and a top cover;
a tray pivotally mounted to the chassis between a closed storage position and an open access position relative to the chassis;
a first cable port at the first side of the chassis for allowing one of an input or output cable to extend out to an exterior of the chassis from the first side of the chassis; and
a second cable port at the second side of the chassis for allowing the other of the input or output cable to extend out to the exterior of the chassis from the opposite second side of the chassis,
wherein the top cover of the chassis is configured such that the other of the input or output cable can follow a cable path across the chassis, positioned above the pivotable tray, be fixed relative to the top cover to stay out of the way of the tray during pivotal movement of the tray, and extend out to the exterior of the chassis from the opposite second side of the chassis, wherein the pivotable tray is pivotable with respect to the chassis via a hinge, and the first cable port is positioned adjacent the hinge to limit pulling on the one of the input or output cable extending out from the first side of the chassis during pivotable movement of the tray.

2. The telecommunications system of claim 1, wherein the top cover defines a trough for positioning and fixing the other of the input or output cable extending across the chassis from the first side toward the second side.

3. The telecommunications system of claim 2, wherein the trough is defined at an underside of the top cover of the chassis.

4. The telecommunications system of claim 3, wherein the trough extends along a majority of the width from the first side to the second side of the chassis.

5. The telecommunications system of claim 1, wherein the chassis includes a cable management ring on both the first side and the second side of the chassis for managing cables coming into or going outside the chassis.

6. The telecommunications system of claim 5, wherein the cable management rings on the first and second sides of the chassis are provided in the form of split-rings.

7. The telecommunications system of claim 1, wherein the chassis includes a cable manager adjacent the hinge for contacting and leading the other of the input and output cable therearound before extending across the chassis for limiting pulling on the cable during pivotal movement of the tray.

8. The telecommunications system of claim 7, wherein the cable manager is configured to pivot with the tray.

9. The telecommunications system of claim 7, wherein the cable manager defines two bend radius limiting portions disposed perpendicularly to each other, wherein a first of the two portions is configured to contact the other of the input and output cable when the tray is in the closed storage position, and a second of the two portions is configured to contact the other of the input and output cable when the tray is in the open access position.

10. The telecommunications system of claim 9, wherein the cable manager is L shaped and defines a cable retention portion for keeping cables in contact with at least one of the two bend radius limiting portions.

11. The telecommunications system of claim 1, wherein the first side is a right side of the chassis and the second side is a left side of the chassis.

12. The telecommunications system of claim 1, further comprising at least one telecommunications component removably mounted to the tray, wherein the one of the input or output cable is from the telecommunications component and extends out to an exterior of the chassis from the first side of the chassis and the other of the input or output cable is also from the telecommunications component and follows a cable path across the chassis.

13. The telecommunications system of claim 12, wherein the cable extending from the first side of the chassis is a signal output cable.

14. The telecommunications system of claim 13, wherein the cable extending across the chassis is an input cable.

15. The telecommunications system of claim 12, wherein the at least one telecommunications component is an optical component in the form of a fiber optic splitter.

16. The telecommunications system of claim 12, wherein the tray houses a plurality of removably mounted telecommunications components each having input and output cables.

17. The telecommunications system of claim 16, wherein each telecommunications component includes an associated cable manager mounted within the tray for leading cables extending from the components toward the pivot hinge of the tray.

18. The telecommunications system of claim 17, wherein the associated cable managers are defined by spools.

\* \* \* \* \*